United States Patent
Chen et al.

(10) Patent No.: US 8,577,973 B2
(45) Date of Patent: Nov. 5, 2013

(54) ACCELERATED MICRO BLOGGING USING CORRELATED HISTORY AND TARGETED ITEM ACTIONS

(75) Inventors: Li Chen, Cary, NC (US); John R. Hind, Raleigh, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/826,781

(22) Filed: Jun. 30, 2010

(65) Prior Publication Data

US 2012/0005275 A1 Jan. 5, 2012

(51) Int. Cl.
| | |
|---|---|
| G06F 15/16 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |

(52) U.S. Cl.
USPC ............ 709/206; 715/259; 715/752; 715/760

(58) Field of Classification Search
USPC .......................................... 709/206; 715/752
See application file for complete search history.

(56) References Cited

U.S. PATENT DOCUMENTS

| | | | | |
|---|---|---|---|---|
| 6,727,916 | B1 * | 4/2004 | Ballard | .......................... 715/758 |
| 6,732,332 | B1 | 5/2004 | Borysewicz et al. | |
| 6,859,213 | B1 * | 2/2005 | Carter | ............................ 715/752 |
| 7,181,493 | B2 * | 2/2007 | English et al. | ................ 709/204 |
| 7,519,658 | B1 | 4/2009 | Anglin et al. | |
| 7,653,695 | B2 | 1/2010 | Flury et al. | |
| RE41,754 | E * | 9/2010 | Knight | .......................... 715/751 |
| 8,146,004 | B2 * | 3/2012 | Koch | ............................ 715/758 |
| 2002/0069217 | A1 | 6/2002 | Chen et al. | |

(Continued)

FOREIGN PATENT DOCUMENTS

| | | |
|---|---|---|
| GB | 2445670 A | 7/2008 |
| WO | 2008033840 A2 | 3/2008 |
| WO | WO 2008034649 A1 * | 3/2008 |

OTHER PUBLICATIONS

Akshay Java, Xiaodan Song, Tim Finin and Belle Tseng "Why We Twitter:Understanding Microblogging Usage and Communities" Joint $9^{th}$ WEBKDD and $1^{st}$ SNA-KDD Workshop '07, Aug. 12, 2007.*

(Continued)

Primary Examiner — Carolyn B Kosowski
Assistant Examiner — Jason C Chiang
(74) Attorney, Agent, or Firm — Law Office of Jim Boice

(57) ABSTRACT

A computer implemented method correlates a digital resource with an electronic message. A processor detects a focus on a targeted item that identifies a digital resource. The targeted item is in a user history that presents a history of a user's access to multiple digital resources. The processor then auto-populates a draft of an electronic message with the targeted item that was focused in the user history.

12 Claims, 4 Drawing Sheets

(56) References Cited

U.S. PATENT DOCUMENTS

| | | | |
|---|---|---|---|
| 2004/0201668 A1* | 10/2004 | Matsubara et al. | 348/14.05 |
| 2005/0188029 A1* | 8/2005 | Asikainen et al. | 709/206 |
| 2007/0038938 A1 | 2/2007 | Canora et al. | |
| 2008/0184138 A1* | 7/2008 | Krzanowski et al. | 715/760 |
| 2009/0063961 A1* | 3/2009 | Chakra et al. | 715/259 |
| 2009/0182741 A1* | 7/2009 | Chen et al. | 707/6 |
| 2009/0265325 A1 | 10/2009 | Camoglu et al. | |
| 2009/0307056 A1 | 12/2009 | Park et al. | |
| 2010/0162133 A1* | 6/2010 | Pascal et al. | 715/752 |
| 2010/0241991 A1* | 9/2010 | Bickmore | 715/810 |
| 2010/0306669 A1* | 12/2010 | Della Pasqua | 715/752 |
| 2011/0043652 A1* | 2/2011 | King et al. | 348/222.1 |
| 2011/0251895 A1* | 10/2011 | Bladel | 705/14.54 |

OTHER PUBLICATIONS

Twitter Facts: URL shortening services on Twitter (May 12, 2007), http://twitterfacts.blogspot.com/2007/05/url-shortening-services-on-twitter.html.*

Noll et al., "Telling Experts From Spammers: Expertise Ranking in Folksonomies", ACM Digital Libray, pp. 612-623, Jul. 2009.

Safran et al., "The Benefits of Geo-Tagging and Microblogging in M-Learning: A Use Case", ACM Digital Library, pp. 135-145, Sep.-Oct. 2009.

* cited by examiner

ACCELERATED MICRO BLOGGING USING CORRELATED HISTORY AND TARGETED ITEM ACTIONS

BACKGROUND

The present disclosure relates to the field of computers, and specifically to telecommunications that use computers. Still more particularly, the present disclosure relates to correlating a digital resource with a telecommunication.

A blog (short for "web log") is a web service which accepts and displays or feeds items of commentary, event descriptions, or other material, either at a personal level or on behalf of a group around a topical subject. Items are often large, contain rich content, and tend to express a full exposition of a topic. The short message service (SMS) introduced in the mobile phone market has inspired a new form of blogging known as "Microblogging" where items are smaller in actual size. Microblogging items may be single sentence, a fragment, a photo image, or a brief video. Such items are mainly personal expressions in the vein of "what I am doing", "how I feel", "what I just saw", "I need some help with this", "anyone ever heard of", etc. Various microblogging services offer a community aspect where one can follow the items posted by a personal group of friends, co-workers, etc.

BRIEF SUMMARY

In one embodiment, the present disclosure presents a computer implemented method to correlate a digital resource with an electronic message. A processor detects a focus on a targeted item that identifies a digital resource. The targeted item is in a user history that presents a history of a user's access to multiple digital resources. The processor then auto-populates a draft of an electronic message with the targeted item that was focused in the user history.

In one embodiment, the present disclosure presents a computer system comprising: a central processing unit; and a memory coupled to the central processing unit, wherein the memory comprises software that, when executed, causes the central processing unit to implement: detecting a focus on a targeted item in a user history, wherein the targeted item identifies a digital resource, and wherein the user history presents a history of a user's access to multiple digital resources; and auto-populating a draft of an electronic message with the targeted item that was focused in the user history.

In one embodiment, the present disclosure presents a computer program product comprising: a computer readable storage medium having computer readable program code embodied therewith, the computer readable program code comprising: computer readable program code to detect a focus on a targeted item in a user history, wherein the targeted item identifies a digital resource, and wherein the user history presents a history of a user's access to multiple digital resources; and computer readable program code to auto-populate a draft of an electronic message with the targeted item that was focused in the user history.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
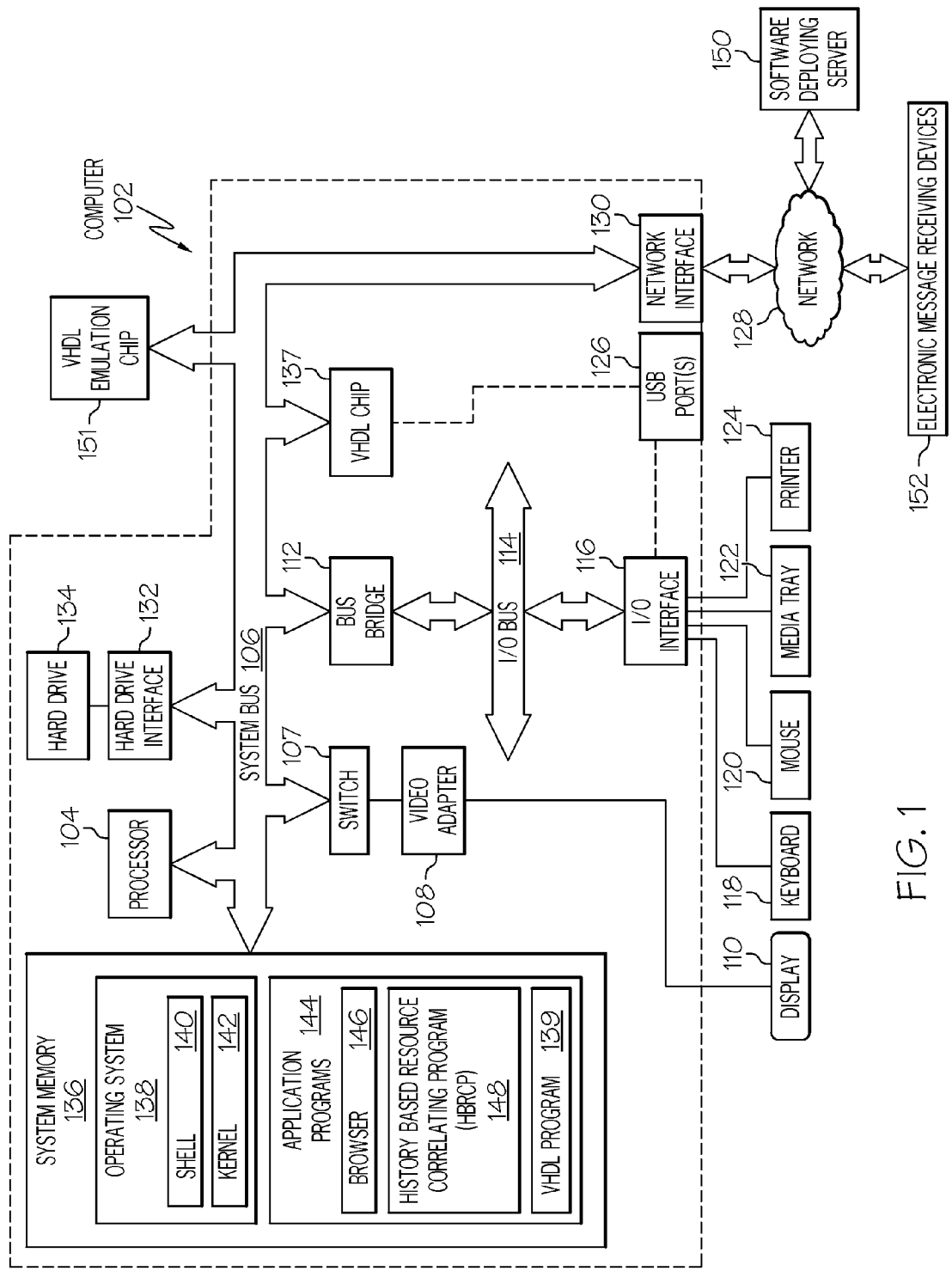
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or electronic message receiving devices 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., history based resource correlating program—HBRCP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or electronic message receiving devices 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a history based resource correlating program (HBRCP) 148. HBRCP 148 includes code for implementing the processes described below, including those described in FIGS. 2-4. In one embodiment, computer 102 is able to download HBRCP 148 from software deploying server 150, including in an on-demand basis, such that the code from HBRCP 148 is not downloaded until runtime or otherwise immediately needed by computer 102. Note further that, in one embodiment of the present disclosure, software deploying server 150 performs all of the functions associated with the present disclosure (including execution of HBRCP 148), thus freeing computer 102 from having to use its own internal computing resources to execute HBRCP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from HBRCP 148 causes VHDL program 139 to configure VHDL chip 137, which may be an FPGA, ASIC, etc.

In another embodiment of the present disclosure, execution of instructions from HBRCP 148 results in a utilization of VHDL program 139 to program a VHDL emulation chip 151. VHDL emulation chip 151 may incorporate a similar architecture as described above for VHDL chip 137. Once HBRCP 148 and VHDL program 139 program VHDL emulation chip 151, VHDL emulation chip 151 performs, as hardware, some or all functions described by one or more executions of some or all of the instructions found in HBRCP 148. That is, the VHDL emulation chip 151 is a hardware emulation of some or all of the software instructions found in HBRCP 148. In one embodiment, VHDL emulation chip 151 is a programmable read only memory (PROM) that, once burned in accordance with instructions from HBRCP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Note further that computer 102 and/or one or more of the electronic message receiving devices 152 may be a desktop computer, a laptop computer, a "smart phone," a personal digital assistant (PDA), or any other device capable of performing the functions described herein.

Figure 2:
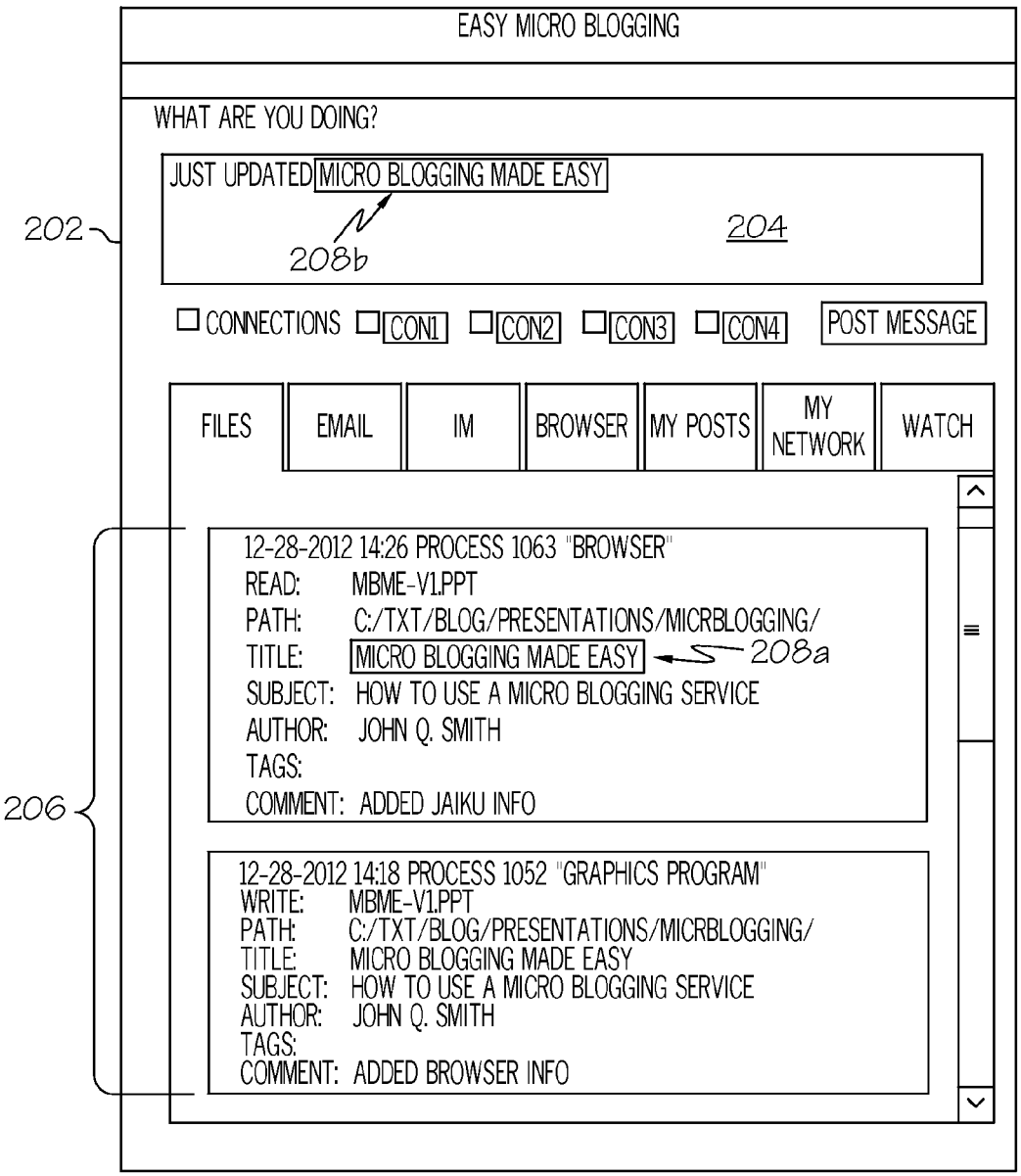
FIG. 2 illustrates a user interface having a draft of an electronic message being auto-populated with an identifier of a digital resource.

With reference now to FIG. 2, a user interface 202 on a display of a device (e.g., display 110 for computer 102 shown in FIG. 1) being used to compose an electronic message is presented. User interface 202 comprises a draft window 204 for typing in a draft of an electronic message. For purposes of illustration, assume that the electronic message is a micro-blog, which by protocol-defined limits, may not exceed a certain number of characters. Micro-blogs are transmitted to mobile devices such as electronic message receiving devices 152 (e.g., cell phones) shown in FIG. 1, and may be generated on a traditional computer or from a smart phone (exemplary embodiments of computer 102 and/or electronic message receiving devices 152 shown in FIG. 1). Contents of the micro-blogs (or other electronic messages) can be posted on one or more connection networks (e.g., social networks, etc.), depicted as CON1-CON4. Note that the exemplary draft in draft window 204 begins with "Just updated", indicating the start of a micro-blog posting that will respond to the generic question "What are you doing?"

Also displayed on the user interface 202 of FIG. 2 is a user history 206 of digital resources that the author of the draft has created and/or accessed. For example, a first targeted item 208*a* identifies a presentation file labeled "Micro Blogging Made Easy". When the user (i.e., the author of the draft in draft window 204) causes a focus to be applied to the first targeted item 208*a* labeled "Micro Blogging Made Easy" (i.e., by highlighting/swiping/etc.), this first targeted item 208*a* (i.e., label/identifier/name) is auto-populated into the draft, as shown by first targeted item 208*b*. At this point, a reader of the electronic message will know what the author of the micro-blog has been updating, but will not know how to access that updated work.

In one embodiment, the user history 206 is in chronological order, with the most recently accessed digital resource being presented at the top of the chronological order, in order to correspond with the "Just updated" content of the draft of the electronic message.

Figure 3:
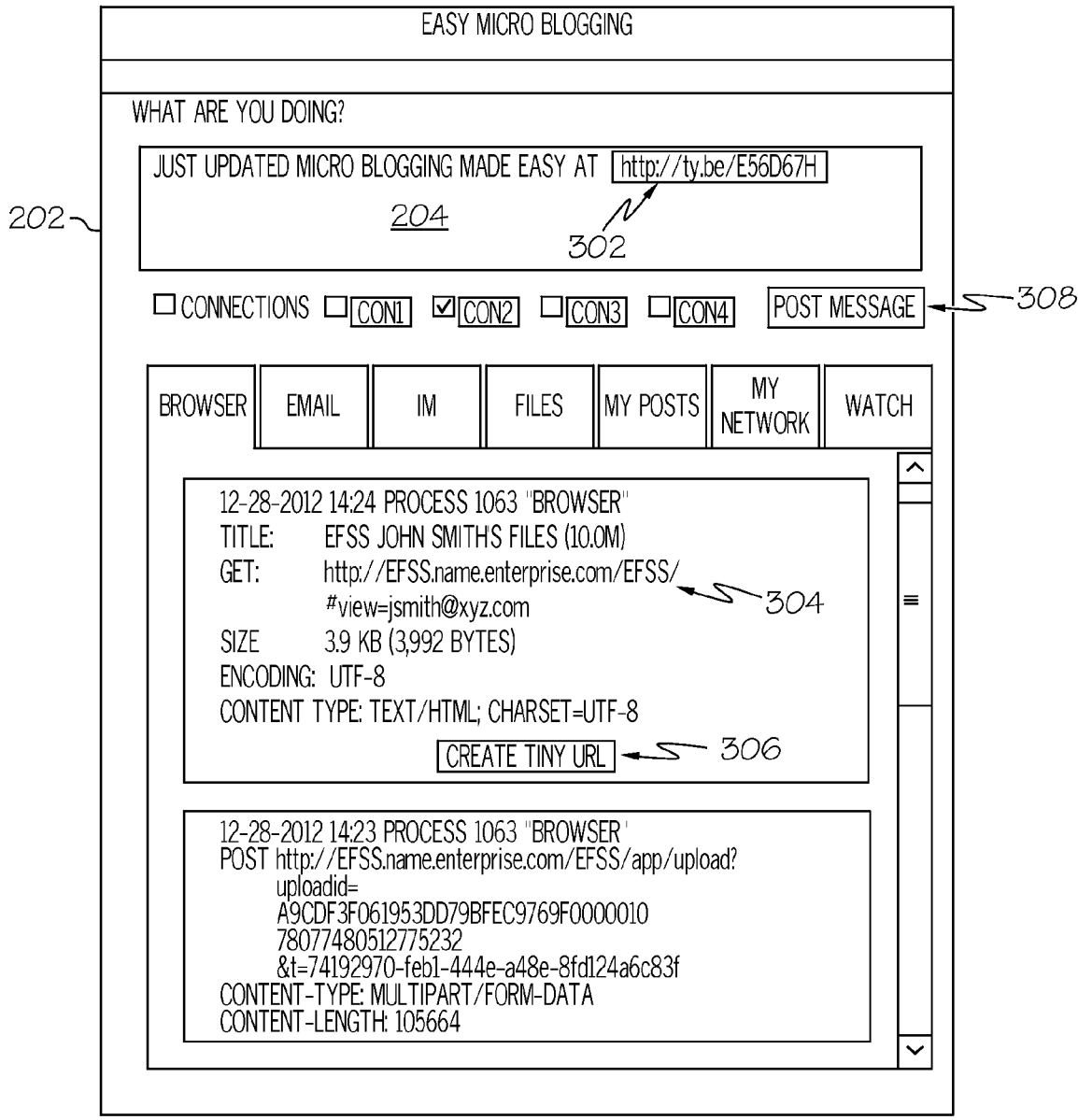
FIG. 3 illustrates the user interface of FIG. 2 with the draft of the electronic message being further auto-populated with a resource locator for the digital resource.

Referring now to FIG. 3, the user interface 202 depicted in FIG. 2 shows draft window 204 updated with a tiny second targeted item 302. This tiny second targeted item 302 provides a locator (shown for exemplary purposes as "http://ty.be/E56D67H") for retrieving the digital resource that is identified by the first targeted item 208*a/b* ("Micro Blogging Made Easy") shown in FIG. 2. The tiny second targeted item 302 is a "tiny" version of the uniform resource locator (URL) information needed to retrieve the digital resource "Micro Blogging Made Easy." A "tiny" uniform resource locator (tiny URL) is created when a user focuses on (i.e., by swiping/highlighting) an original second targeted item 304, and then clicks the button 306. Clicking button 306 causes the full URL, as shown in the original second targeted item 304 as "http://EFSS.name.enterprise.com/EFSS/#view=jsmith@xyz.com", to be renamed into a shortened (tiny) URL. This tiny URL has been assigned by a tiny URL service, which maps the full URL shown in the original second targeted item 304 to the tiny URL shown in the tiny second targeted item 302. Note that in the example shown, the digital resource identified as "Micro Blogging Made Easy" is a file that is located within an enterprise file sharing service (EFSS), which affords multiple users the ability to access, via the web, files in a consolidated source (e.g., files that have been imported from a local storage device in an enterprise).

Note that in one embodiment, the locator for the highlighted targeted item may be derived from a history function. That is, a listing of recently used locators (URLs, file path names, etc.) can be auto-displayed when the targeted item is highlighted. This allows the user to quickly select recently used locators in a similar manner to that described above.

In one embodiment, the user need not type the entire name of the targeted item. Rather, a type-ahead function can be used to retrieve and display the name of the targeted item in the draft window 204. Note that this type-ahead function does more than simply anticipate a word or even phrase. Rather, the type-ahead function anticipates the name of file that is needed by the user, by analyzing which resources were recently used, and then retrieves that file's locator in order to auto-populate the draft window 204 with that file's locator.

In one embodiment, the resource can be re-formatted according to a particular connection's format. For example, assume that the user wishes to allow the user of CON2 to access "Micro Blogging Made Easy". However, this resource is initially referenced by an http address. In the present embodiment, this http address is automatically converted into an address/format that can be interpreted by CON2, and thus is accessible to the user of CON2.

As noted above, by clicking the button 306 and focusing on the original second targeted item 304, the draft in draft window 204 is auto-populated with the tiny second targeted item 302. This draft of the electronic message, which includes both the name ("Micro Blogging Made Easy") and the locator ("http://ty.be/E56D67H") of the digital resource correlated with the electronic message, can then be broadcast/transmitted to receiving devices (e.g., electronic message receiving devices 152 shown in FIG. 1) by clicking post message button 308. Note that a particular connection system (CON2) has been selected for the posting.

Figure 4:
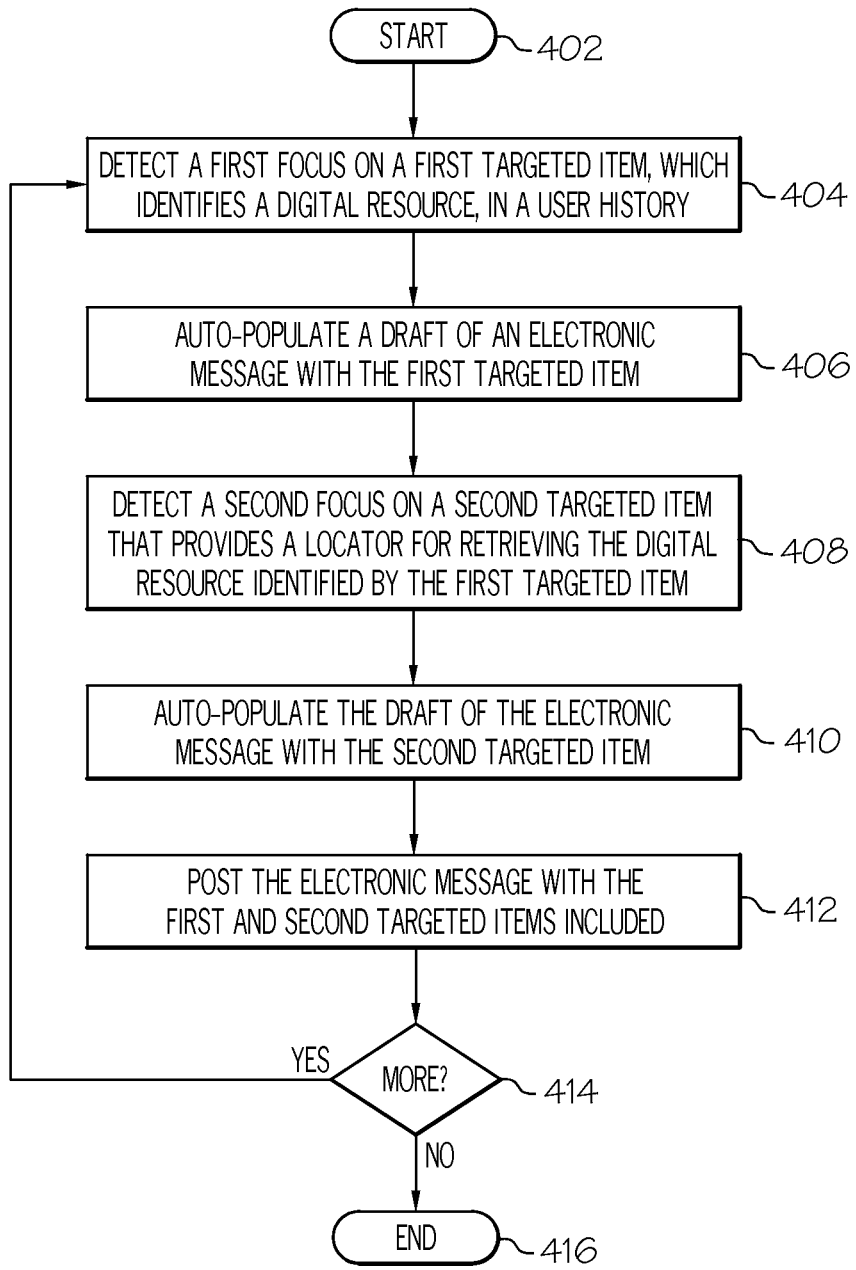
FIG. 4 is a high level flow chart of one or more exemplary steps taken by a computer to correlate a digital resource with an electronic message.

Referring now to FIG. 4, a high level flow chart of one or more exemplary steps taken by a computer to correlate a digital resource with an electronic message is presented. After initiator block 402, a first focus on a first targeted item in a user history is detected (block 404). This first targeted item identifies a digital resource. The user history presents a history of a user's access to multiple digital resources. As depicted in block 406, a draft of an electronic message is then auto-populated with the first targeted item that was focused in the user history. Note that the multiple digital resources located in the file history may be from varied sources. In one embodiment, the multiple digital resources are files (e.g., text files, graphic presentation files, audio files, video files, etc.) from an enterprise file sharing service. This enterprise file sharing service may be restricted to members of an enterprise, or it may be open to the public. In another embodiment, the multiple digital resources are e-mails that have been previously sent from or received by an author of the draft of the electronic message. In another embodiment, the multiple digital resources are instant messages that have been sent from and/or received by the author of the draft of the electronic message. In another embodiment, the multiple digital resources are web pages that the author of the draft of the electronic message has accessed in the past. In another embodiment, the multiple digital resources are previous blog or micro-blog postings from or to the author of the draft of the electronic message.

Referring now to block 408, a second focus on a second targeted item is then detected. This second targeted item provides a locator (e.g., a URL, a tiny URL, a pathway to a file on a storage device, etc.) for retrieving the digital resource that is identified by the first targeted item. As described in block 410, the draft of the electronic message is then auto-populated with the second targeted item, thus enabling a recipient of the electronic message to access the digital resource identified by the first targeted item when the electronic message has been posted (transmitted) with the first and second targeted items included therein (block 412). In one embodiment, the electronic message is transmitted from computer 102 to electronic message receiving devices 152 shown in FIG. 1. If there are more targeted items to auto-populate the draft of the electronic message, then the process continues in a reiterative manner (query block 414). The process ends at terminator block 416.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method to correlate a digital resource with an electronic message, the computer implemented method comprising:
    a processor detecting a first focus on a first targeted item in a user history, wherein the first targeted item identifies a digital resource, and wherein the user history presents a history of a user's access to multiple digital resources;
    the processor auto-populating a draft of an electronic message with the first targeted item that was focused on in the user history;
    the processor detecting a second focus on a second targeted item, wherein the second targeted item includes a locator for retrieving the digital resource that is identified by the first targeted item;
    the processor auto-populating the draft of the electronic message with the second targeted item;
    the processor presenting the user history in chronological order on a user interface, wherein a most recently accessed digital resource is presented at a top of the chronological order;
    the processor, in response to the electronic message containing a user-entered text indicating a most recent activity of a user, auto-populating the electronic message with the most recently accessed digital resource;
    the processor implementing a type-ahead function to anticipate which digital resource is being requested by the user for entry into the electronic message, wherein a requested digital resource is identified by the type-ahead function anticipating a name of a particular digital resource that is being requested by the user;
    the processor retrieving a file locator for the particular digital resource from most recently accessed digital resources from the user history; and
    the processor auto-populating the electronic message with the file locator for the particular digital resource.

2. The computer implemented method of claim 1, wherein the electronic message utilizes a micro blog format, and wherein the computer implemented method further comprises:
    in response to detecting a user selection of a full Hypertext Transfer Protocol (HTTP) address for the digital resource, the processor automatically reformatting the HTTP address into a tiny uniform resource locator (URL) using the micro blog format; and
    the processor auto-populating the draft of the electronic message with the tiny URL.

3. The computer implemented method of claim 1, wherein the electronic message is a micro blog that has a protocol-defined limited number of characters.

4. The computer implemented method of claim 1, wherein the multiple digital resources are files from an enterprise file sharing service.

5. The computer implemented method of claim 1, wherein the multiple digital resources are e-mails from an author of the draft of the electronic message.

6. The computer implemented method of claim 1, wherein the multiple digital resources are instant messages from an author of the draft of the electronic message.

7. The computer implemented method of claim 1, wherein the multiple digital resources are web pages that have been accessed by an author of the draft of the electronic message.

8. The computer implemented method of claim 1, wherein the multiple digital resources are previous blog postings from an author of the draft of the electronic message.

9. A computer system comprising:
    a central processing unit; and
    a memory coupled to the central processing unit, wherein the memory comprises software that, when executed, causes the central processing unit to implement:
    detecting a first focus on a first targeted item in a user history, wherein the first targeted item identifies a digital resource, and wherein the user history presents a history of a user's access to multiple digital resources;
    auto-populating a draft of an electronic message with the first targeted item that was focused on in the user history;

detecting a second focus on a second targeted item, wherein the second targeted item includes a locator for retrieving the digital resource that is identified by the first targeted item;

auto-populating the draft of the electronic message with the second targeted item;

presenting the user history in chronological order on a use interface, wherein a most recently accessed digital resource is presented at a top of the chronological order;

in response to the electronic message containing a user-entered text indicating a most recent activity of a user, auto-populating the electronic message with the most recently accessed digital resource;

implementing a type-ahead function to anticipate which digital resource is being requested by the user for entry into the electronic message, wherein a requested digital resource is identified by the type-ahead function anticipating a name of a particular digital resource that is being requested by the user;

retrieving a file locator for the particular digital resource from most recently accessed digital resources from the user history; and auto-populating the electronic message with the file locator for the particular digital resource.

10. The computer system of claim 9, wherein the electronic message is a micro blog that has a protocol-defined limited number of characters.

11. A computer program product comprising:

a non-transitory computer readable storage medium having computer readable program code embodied therewith, the computer readable program code comprising:

computer readable program code to detect a first focus on a first targeted item in a user history, wherein the first targeted item identifies a digital resource, and wherein the user history presents a history of a user's access to multiple digital resources;

computer readable program code to auto-populate a draft of an electronic message with the first targeted item that was focused on in the user history;

computer readable program code to detect a second focus on a second targeted item, wherein the second targeted item includes a locator for retrieving the digital resource that is identified by the first targeted item;

computer readable program code to auto-populate the draft of the electronic message with the second targeted item;

computer readable program code to present the user history in chronological order on a user interface, wherein a most recently accessed digital resource is presented at a top of the chronological order; and computer readable program code to, in response to the electronic message containing a user-entered text indicating it most recent activity of a user, auto-populate the electronic message with the most recently accessed digital resource;

computer readable program code to implement a type-ahead function to anticipate which digital resource is being requested by the user for entry into the electronic message, wherein a requested digital resource is identified by the type ahead function anticipating a name of a particular digital resource that is being requested by the user;

computer readable program code to retrieve a file locator for the particular digital resource from most recently accessed digital resources from the user history; and computer readable program code to auto-populate the electronic message with the file locator for the particular digital resource.

12. The computer program product of claim 11, wherein the electronic message is a micro blog that has a protocol-defined limited number of characters.

* * * * *